(12) United States Patent
Webb

(10) Patent No.: US 11,959,565 B2
(45) Date of Patent: Apr. 16, 2024

(54) PIPE COUPLING WITH IMPROVED TENSIONING SYSTEM

(71) Applicant: TAYLOR KERR (COUPLINGS) LIMITED, Milton Keynes (GB)

(72) Inventor: Ian Richard Webb, Milton Keynes (GB)

(73) Assignee: TAYLOR KERR (COUPLINGS) LIMITED, Milton Keynes (GB)

( * ) Notice: Subject to any disclaimer, the term of this patent is extended or adjusted under 35 U.S.C. 154(b) by 381 days.

(21) Appl. No.: 17/278,853

(22) PCT Filed: Sep. 20, 2019

(86) PCT No.: PCT/GB2019/052655
§ 371 (c)(1),
(2) Date: Mar. 23, 2021

(87) PCT Pub. No.: WO2020/065274
PCT Pub. Date: Apr. 2, 2020

(65) Prior Publication Data
US 2022/0034435 A1 Feb. 3, 2022

(30) Foreign Application Priority Data
Sep. 24, 2018 (GB) .................................. 1815542

(51) Int. Cl.
*F16L 21/06* (2006.01)
*F16L 55/172* (2006.01)

(52) U.S. Cl.
CPC ............ *F16L 21/065* (2013.01); *F16L 55/172* (2013.01)

(58) Field of Classification Search
CPC ....... F16L 21/065; F16L 21/08; F16L 55/172; F16L 55/1725; F16L 55/17; F16L 55/1705; F16L 55/1715; F16L 55/178
(Continued)

(56) References Cited

U.S. PATENT DOCUMENTS

| 4,381,020 A * | 4/1983 | Daghe .................. F16L 21/005 24/279 |
| 10,830,386 B2 | 11/2020 | Webb et al. |
| 2004/0100091 A1 | 5/2004 | Krausz et al. |

FOREIGN PATENT DOCUMENTS

| CN | 201242004 Y | 5/2009 |
| CN | 104180125 A | 12/2014 |

(Continued)

OTHER PUBLICATIONS

PCT Search Report and Written Opinion prepared for PCT/GB2019/052655, completed Dec. 3, 2019.
(Continued)

*Primary Examiner* — Aaron M Dunwoody
(74) *Attorney, Agent, or Firm* — Barnes & Thornburg LLP

(57) ABSTRACT

The present invention relates to a pipe coupling comprising: a tubular casing, having a longitudinal gap between a first free end and a second free end, for fitting around a pipe; and a tensioning system for tightening the casing around the outer surface of the pipe, the system comprising: at least one fastener having a first end and a second end, for tightening the casing around the pipe; a first member, coupled to the first free end of the casing, configured to engage with the first end of the or each fastener; and a second member, slidably coupled to the second free end of the casing, configured to engage with the second end of the or each fastener, the second member being longitudinally slidable from a first position, in which the or each fastener is free to move radially out of engagement with said second member, to a second position in which the or each fastener is in retained engagement with said second member.

17 Claims, 10 Drawing Sheets

(58) Field of Classification Search
USPC .............................................. 285/86, 82, 81
See application file for complete search history.

(56) References Cited

FOREIGN PATENT DOCUMENTS

| | | |
|---|---|---|
| CN | 204852250 U | 12/2015 |
| EP | 2700862 | 2/2014 |
| EP | 2129953 B1 | 7/2015 |
| JP | 2001193720 | 7/2001 |
| KR | 200422113 | 7/2006 |
| KR | 100883643 | 2/2009 |
| KR | 101150212 | 3/2010 |
| KR | 200451092 Y1 | 11/2010 |
| KR | 101313280 | 9/2013 |
| KR | 101313280 B1 | 9/2013 |

OTHER PUBLICATIONS

Chinese Office Action prepared for Chinese Patent Application No. 201980062834.6, dated Apr. 26, 2022.
Office Action received for Japanese Patent Application Serial No. 2021-516569, dated Jul. 25, 2023.

* cited by examiner

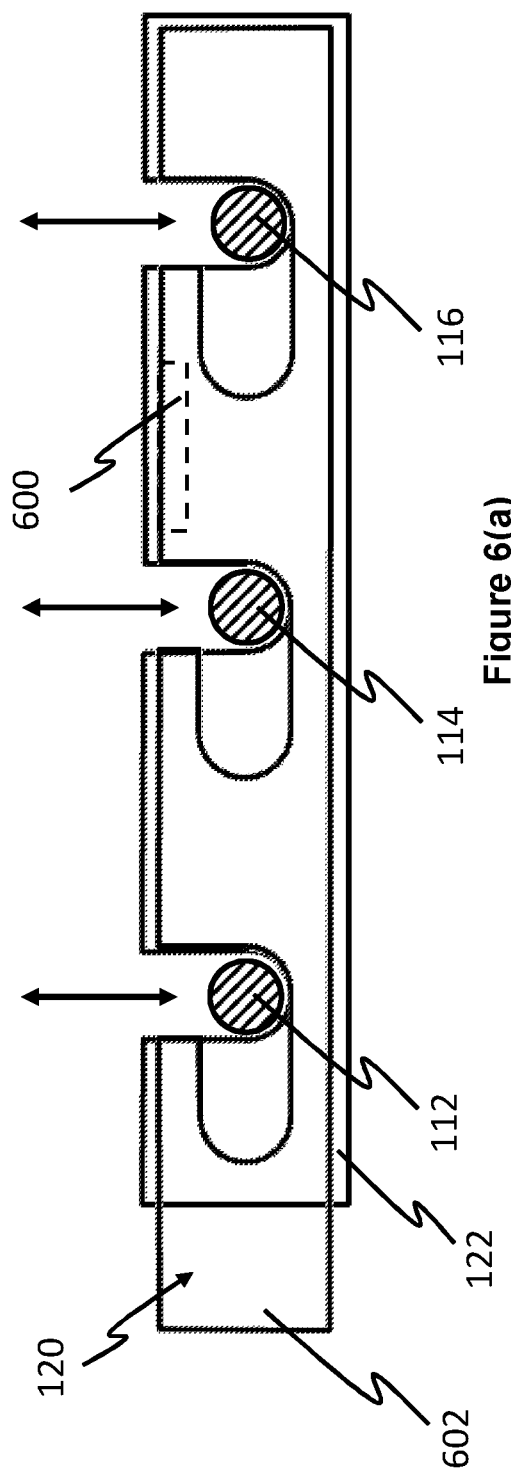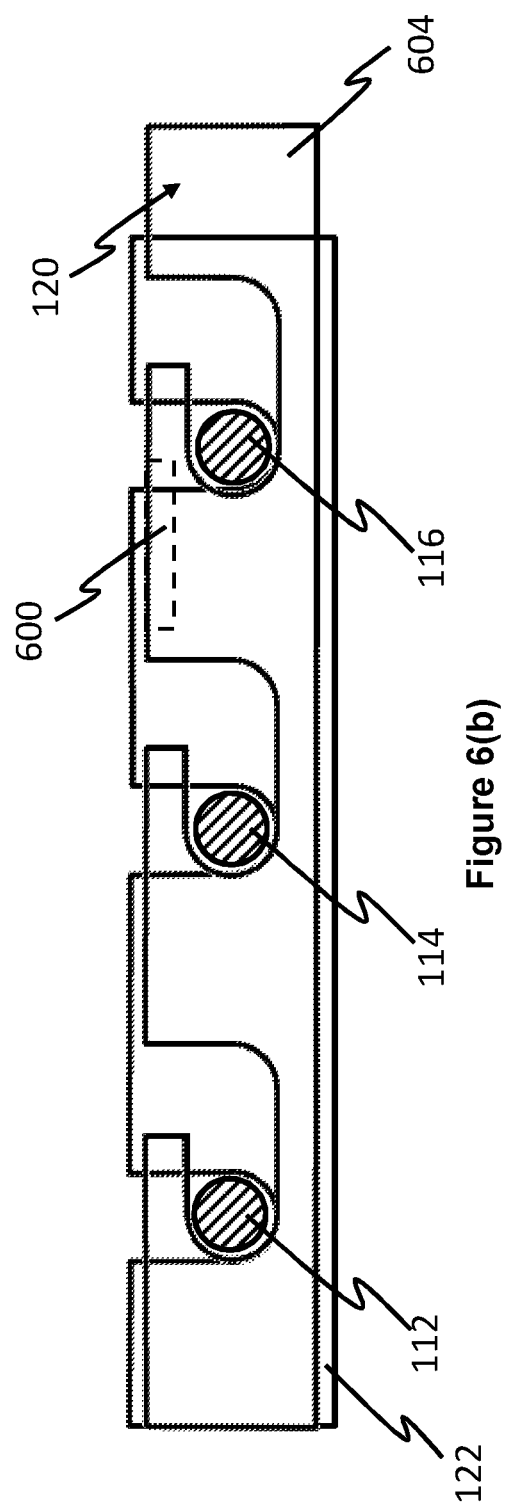

PIPE COUPLING WITH IMPROVED TENSIONING SYSTEM

CROSS-REFERENCE TO RELATED APPLICATIONS

This application is the U.S. national phase of PCT/GB2019/052655, filed on Sep. 20, 2019, which claims the benefit of United Kingdom Patent Application Number 1815542.4, filed on Sep. 24, 2018, the entire disclosures of both of which are hereby incorporated by reference herein.

FIELD OF THE INVENTION

The present invention relates to a pipe coupling connecting together the ends of two pipes. In particular, the invention relates to pipe and repair couplings comprising a tubular casing for fitting around a pipe and a tensioning system for tightening the casing around the outer surface of the pipe.

BACKGROUND

Joining together pipes with plan ends with such couplings avoids the need for pipe preparation and is therefore quicker and more economical than other methods such as welding, screw threading, flanging, grooving or shouldering. It is also an important requirement that the pipe couplings are capable to withstand a substantial fluid pressure.

For example, EP-A-2 129 953 describes a pipe coupling incorporating a bridging member of rolled steel located inside the casing and spanning the longitudinal gap between the free ends of the casing. The bridging member is curved about the centre axis of the casing and the end margins of the bridging member are bent inwardly at right angles to the part-cylindrical web portion of the bridging member to form flanges projecting inwardly toward the centre axis of the casing. In use, when the coupling is tightened around the pipe via tensioning means, the bridging member effectively sits inside the casing to ensure that an even pressure distribution is applied to the entire periphery of a sealing gasket located within the casing. Additionally, the casing is formed of a rolled steel strip whereby the free ends of the strip which form the casing are folded back on themselves and welded at a circumferential position of the strip to form loops along opposite sides of the longitudinal gap. The loops, together with pins inserted in the loops and tensioning bolts passing through transverses hole in the pins, form the tensioning means.

In addition, pipe repair clamps are known. Such clamps are configured to enable in-situ repair of damaged pipelines, and as such generally comprise a hinge to enable the clamp to be installed. Often such clamps are required to be installed in small confined spaces, such as trenches. One such repair clamp is described in WO 2008/065364 A1, where the repair clamp assembly comprises two clamp portions, hingedly coupled to each other, and a securement means, in the form of a bolt and nut, for drawing the clamp portions together about the damaged portion of the pipeline. The bolt and nut engages with slots provided in lugs on each clamp portion. During installation, such an arrangement presents significant challenges to the installer. The bolt and nut can be difficult to engage with the lug, and can fall out as the clamp is closed around the pipeline. In addition, and especially for large diameter pipe clamps, the installer is required to carry out three operations more or less simultaneously: 1. maintaining the clamp portions together to enable the bolt and nut to be engaged; 2. maintaining the bolt and nut in engagement with the lugs; and 3. tightening the nut onto the bolt until it has sufficiently engaged with the lugs to both maintain the clamp portions together and maintain the bolt and nut within the lugs. Carrying out these three operations simultaneously is very difficult.

Another such repair clamp is described in U.S. Pat. No. 4,381,020, where the repair clamp comprises a flexible band having a tensioning system with a pair of trunnion loading bars, each bar attached at a respective end of the band. One of the trunnion bars is configured to receive T-bolts, enabling the bolt to be engaged and disengaged with the trunnion bar with the nut in place on the bolt. The other of the trunnion bars is formed in two parts, each part partially rotatable about the flexible band enabling the bolts to be rotated away from the gap to allow for installation. This type of repair clamp can also be difficult to install. To place the T-bolt in the trunnion bar slot requires the clamp ends to be brought together by hand, which can require significant force and dexterity.

US 2004/0100091 A1 also discloses a pipe repair clamp with a tensioning system which enables the bolts to be engaged and disengaged while the nuts for tightening the tensioning system are partially screwed onto the bolts. This tensioning system has wedge shaped protrusions with radially projecting slots for allowing the bolts to pass through to enable engagement. A bar is provided with through holes for receiving the bolts, the bar having a concave surface which engages with a corresponding convex surface on the wedge portion.

These convex and concave surfaces act to prevent the bolts from disengaging. Similarly to the pipe clamps described above, this clamp also requires significant force and dexterity to install.

Given these significant problems with the known pipe repair clamps, it is an object of the present invention to provide a pipe clamp or coupling, preferably suitable for repairing pipelines, with an improved tensioning system which enables easier installation.

SUMMARY

According to a first aspect of the present invention, there is provided a pipe coupling comprising: a tubular casing, having a longitudinal gap between a first free end and a second free end, for fitting around a pipe; and a tensioning system for tightening the casing around the outer surface of the pipe, the system comprising: at least one fastener having a first end and a second end, for tightening the casing around the pipe; a first member, coupled to the first free end of the casing, configured to engage with the first end of the or each fastener; and a second member, slidably coupled to the second free end of the casing, configured to engage with the second end of the or each fastener, the second member being longitudinally slidable from a first position, in which the or each fastener is free to move radially out of engagement with said second member, to a second position in which the or each fastener is in retained engagement with said second member.

Providing the tensioning system with a second member, slidable from a first, unlocked, position, to a second, locked, position, advantageously enables the tensioning system to be engaged more easily. This in turn enables the pipe coupling to be installed more easily than with known pipe coupling systems.

The tensioning system preferably further comprises a tubular portion, coupled to the second free end of the casing, having at least one transverse slot, the or each slot configured to receive a respective fastener, the second member being configured to slide within said tubular portion from the first position to the second position. In this embodiment, the second member may be formed of steel, stainless steel, or a plastic, such as a nylon (polyamide), ABS (acrylonitrile butadiene styrene), or PEEK (polyether ether ketone). Any other suitable plastic having a relatively low coefficient of friction would be suitable. The tubular portion may be formed of a metal, such as stainless steel.

Advantageously, providing such a tubular portion enables the second member to more easily slide relative to the casing. In addition, in the embodiments where the second member slides within the tubular portion, the or each fastener is configured to act on the tubular portion, enabling the second member to be formed of a lightweight, low friction material.

The or each fastener preferably comprises a washer, having a planar face and a concave face, configured such that the fastener engages the planar face, and the concave face engages the tubular portion. In this way, the force transfer between the fastener and the tubular portion may be over a greater surface area, reducing the pressure. The inner surface of the washer, adjacent the fastener, may comprise an annular recess, the annular recess housing a resilient retaining member configured to retain the washer on the fastener. The resilient retaining member advantageously prevents the washer from sliding along the fastener during installation. In this way, the washers remain in place on the fastener, adjacent the head of the fastener, such that it is in position to engage the tubular portion upon the fasteners being positioned within the transverse slots of the tubular portion.

The second member preferably comprises: at least one elongate recess, the or each recess configured to receive a portion of a respective fastener adjacent its second end; and at least one corresponding protrusion extending longitudinally from an edge of the recess to partially cover an open side of the recess. In the first position, an uncovered portion of the recess is substantially longitudinally aligned with the corresponding fastener, and in the second position, a covered portion of the recess is substantially longitudinally aligned with the corresponding fastener. In this way, aligning the protrusion with the fastener, i.e. latching the fastener within the second member, locks it in position, maintaining the fastener in retained engagement.

The or each elongate recess may have a longitudinal length of between about 2 times the diameter of the fastener, and about 4 times the diameter of the fastener. Preferably, the longitudinal length of the elongate recess is between about 2 times the diameter of the fastener, and about 3 times the diameter of the fastener. More preferably, the longitudinal length of the elongate recess is between about 2.25 times the diameter of the fastener, and about 2.75 times the diameter of the fastener.

In an alternative embodiment, where the tensioning system further comprises a tubular portion, coupled to the second free end of the casing, having at least one transverse slot, the or each slot configured to receive a respective fastener, the second member being configured to slide within said tubular portion from the first position to the second position, the second member may be an elongate rod, or an elongate plate. In this alternative embodiment, the tubular portion may comprise a guide member, configured to guide the second member upon movement from the first position to the second position. The guide member may be a plug, configured to fit within one end of the tubular portion, the plug comprising an aperture for receiving the second member. Where the second member is an elongate plate, the plate may be substantially planar, or alternatively may be arcuate. Where the second member is an elongate rod, the rod may be circular, or have any other suitable cross-sectional profile.

The first member is preferably rotatably coupled, about a longitudinal axis, to the first free end of the casing. The first member may comprise a first tubular portion and at least one cylindrical portion, the cylindrical portion provided within the first tubular portion. The or each cylindrical portion preferably comprises at least one tapped through hole for receiving a first end of a respective fastener, the first tubular portion comprising at least one through hole, the or each through hole corresponding to a respective tapped hole. The or each cylindrical portion may be formed of a metal, such as stainless steel. Alternatively, the or each cylindrical portion may comprise at least one captive nut for receiving a first end of a respective fastener. The or each nut may be overmoulded into the or each cylindrical portion, if the cylindrical portion is formed of a plastic, such as a nylon (polyamide), ABS (acrylonitrile butadiene styrene), or PEEK (polyether ether ketone). The first tubular portion may have a length substantially corresponding to a longitudinal length of the casing, the total length of the or each cylindrical portion being less than the length of the length of the first tubular portion. The tensioning system preferably comprises a plurality of fasteners, wherein the first member fastener comprises a plurality of cylindrical portions, each cylindrical portion corresponding to a fastener.

Advantageously, providing a tapped hole configured to receive the first end of the or each fastener enables the fasteners to be pre-installed in the tensioning system prior to installation on a pipe. In addition, the fasteners will remain in place in the tensioning system during the installation process, without the need for the installer to adjust the positioning of the or each fastener to ensure it can engage with the second member. This allows for an efficient and easy installation process. The tensioning system may further comprise at least one stop configured to limit the second member to longitudinal movement between the first position and second position. The stop may comprise a pin attached to the casing, and a longitudinal elongate groove in the second member, the elongate groove configured to slide about the pin. Alternatively, the stop may comprise a first tab and a second tab, extending from respective axial ends of the casing to limit movement of the second member.

Advantageously, the stop enables the second member to be positioned accurately and easily during the installation process. The installer need only push the second member in a direction towards the first position until the second member engages with the stop, enabling the fasteners to be brought into engagement with the second member. Once the fasteners are engaged, the installer pushes the second member in an opposite direction towards the second position until the second member engages with the stop, preventing the fasteners from moving out of engagement, i.e. locking them in place.

The second member may comprise indicia configured to indicate to a user when the second member is in the first position. Alternatively, or in addition, the second member may comprise indicia configured to indicate to a user when the second member is in the second position. The indicia may be formed on an end, or ends, of the second member. The indicia may be a colour, such as red or green. In one embodiment, upon the second member being in the first position, the end of the second member having the indicia is configured to protrude from an axial end of the casing. In this embodiment, the indicia may be red. In an alternative embodiment, upon the second member being in the second position, the end of the second member having the indicia is configured to protrude from an axial end of the casing. In this embodiment, the indicia may be green.

In one embodiment, the second member has a longitudinal length substantially equal to the longitudinal length of the casing. As such, in the second position, the ends of the second member may be configured to be substantially aligned with the axial ends of the casing. Alternatively, in the first position, the ends of the second member may be configured to be substantially aligned with the axial ends of the casing.

The tubular casing will typically be formed of a strip of metal or other material formed into a tube with a gap extending longitudinally of the casing between the free ends of the strip, wherein the free ends of the strip are interconnected by the tensioning means. In one example, the free ends of the strip that forms the tubular casing are folded back on themselves and welded to form loops along opposite edges of a longitudinal gap. The first member and second member are inserted in the loops. Slots are cut in the loops so as to provide clearance for the fasteners. In an alternative embodiment, the loops are formed from a separate strip of metal or other material, both free ends of the separate strip being welded to the casing to form the loops. In this alternative embodiment, the separate strip may comprise locating tabs, configured to engage with corresponding slots in the strip for forming the casing. The locating tabs enable the separate strip to be accurately located for welding.

The pipe coupling preferably further comprises a bridge plate located inside the casing for spanning the longitudinal gap between the first free end and the second free end of the tubular casing. The bridge plate is preferably coupled to one of the first free end or the second free end of the tubular casing. The bridge plate may be welded, bonded or soldered to one of the first free end or the second free end of the tubular casing. Coupling the bridge plate to the tubular casing enables the pipe coupling to be installed more easily. The bridge plate will typically be formed in a part-cylindrical shape with a radius of curvature similar to that of the casing. The casing on either side of the longitudinal gap overlaps with the bridge plate.

The casing may be of generally U-shaped cross-section having a web portion with flanges projecting radially inwardly from the axial ends of the web portion to define an annular channel.

The pipe coupling may further comprise at least one arcuate gripping ring having inwardly projecting gripping teeth, located in the tubular casing. The gripping ring preferably forms a complete ring. In a preferred embodiment a plurality of arcuate segments are provided which overlap to form a complete ring. The or each arcuate gripping ring is preferably frusto-conical.

In the embodiment comprising a gripping ring, the ring is preferably formed in two segments. The segments comprise a major segment which subtends an arc of greater than 180° at the axis of the gripping ring and a minor segment which subtends an arc of less than 180° at the axis of the gripping ring. The casing is formed with a longitudinal gap and the tensioning means is arranged to reduce the longitudinal gap when tightened, the minor segment is located adjacent the longitudinal gap and the major segment is located to the side of the casing remote from the longitudinal gap, the major and minor segments overlapping one another on either side of the gap. The tubular casing may further comprise two portions, and a hinge configured to hingedly couple together the two portions. In this way, the pipe coupling is suitable for use as a repair coupling. The first casing portion and second casing portion preferably each comprise a plurality of loops, the loops being interdigitated, the hinge comprising a pin inserted through the interdigitated loops. The loops may be formed from finger portions of a strip of metal, or other suitable material, used to form the casing, the portions being folded back on themselves and welded to form the loops. An axially outermost loop on each casing portion may comprise a tab, inwardly foldable to retain the hinge pin within the loops.

Where the pipe coupling comprises a hinge, the pipe coupling may further comprise a hinge bridge plate located inside the casing for spanning the hinge. The hinge bridge plate may be joined, to one of the first casing portion or the second casing portion, adjacent the hinge. The hinge bridge plate may be joined by welding, such as spot welding, soldering, adhesive, or any other suitable means of joining. The hinge bridge plate will typically be formed in a part-cylindrical shape with a radius of curvature similar to that of the casing. The casing on either side of the hinge overlaps with the bridge plate.

The pipe coupling preferably further comprises a tubular sealing gasket located inside the casing. In the embodiment where the casing is formed of two portions, hinged together, the tubular sealing gasket preferably comprises a first end and a second end, and a longitudinal split between the first end and the second end. The first end is preferably coupled adjacent one of the first free end and the second free end of the casing. The tubular sealing gasket may be attached to a bridge plate, the bridge plate being coupled adjacent one of the first free end and the second free end of the casing and configured to span the longitudinal gap. In this way, the gasket is advantageously held in place within the casing during installation. The tubular sealing gasket may be attached to the bridge plate using adhesive, or by welding. The bridging plate may comprise a plurality of holes in the region to be attached to the gasket, the gasket being attached by adhesive provided at least within the plurality of holes. The adhesive may be liquid rubber, applied on the side of the bride plate opposite to the side adjacent the gasket.

The bridge plate integrated with the tubular sealing gasket, may be slidably attached to the casing. Each axial end of the bridge plate may comprise a tab configured to engage with corresponding elongate slots adjacent the axial ends of the casing. Advantageously, enabling the bridge plate to slide relative to the casing enables a more secure coupling between the pipe coupling and the pipe to be formed. This is because the gasket is allowed to move relative to the casing, and as such can be more easily compressed to form a seal between the gasket and the pipe.

Alternatively, the tubular casing may further comprise two portions, having a longitudinal gap between a first free end and a second free end and a longitudinal gap between a third free end and a fourth free end. A further tensioning system, as described herein, for tightening the casing around the outer surface of the pipe is provided between the third free end and the fourth free end. Advantageously, such a coupling provides increased tolerance, known as "wide range", to enable pipes of less uniform diameter to be coupled together. In this alternative, the fasteners may be oriented in any direction, depending on the space available for fitting the pipe coupling.

The tensioning system preferably comprises a plurality of fasteners. The tensioning system may comprise two, three, four or more fasteners depending on the type of fastener used and the size of the pipe coupling. As will be appreciated, where the pipe coupling comprises a plurality of fasteners, a corresponding number of components and features configured to engage with a fastener are provided.

The pipe coupling of the present invention is suitable for use in the coupling of pipes formed from fibreglass, concrete and a variety of plastic materials including but not limited to polyvinyl chloride (PVC), chlorinated polyvinyl chloride (CPVC), high density polyethylene (HDPE), medium density polyethylene (HDPE), polypropylene (PP), acrylonitrile butadiene styrene (ABS). The pipe coupling of the present invention is also suitable for use in the coupling of metal pipes, such as pipes formed of steel, stainless steel, and cast and ductile iron.

The pipe coupling may be suitable for any pipe having an external diameter of between about 21 mm and about 4500 mm. The pipe coupling of the present invention also accommodates typical pipe tolerances in accordance with, for example, BS EN 877:1999.

As used herein, the term 'axial' is used to refer to the direction defined by the longitudinal axis of the pipe and the term 'radial' is used to refer to a direction defined by a radius of the pipe. The terms 'proximal' and 'distal' are used describe the relative positions of components, or portions of components, of the pipe coupling. As such, 'proximal' components, or portions of components, are nearer to the point of attachment to other components than 'distal' components, or portions of components.

In the following specification, the term "axial" is used to refer to the direction defined by the longitudinal axis of the pipe and the term "radial" is used to refer to a direction defined by a radius of the pipe.

As used herein, the term 'fastener' refers to any suitable means for applying a compressive force to draw together the first pivoting member and the second pivoting member, and includes screws, bolts used with either a standard nut or a clinch nut, rivets, clamps or latches.

According to a further aspect of the present disclosure, there is provided a washer for use between a fastener and a non-planar surface, the washer comprising: a main body having a through hole for receiving a fastener, wherein the main body comprises a first planar surface configured to engage with a fastener, and a non-planar surface opposite said planar surface; and, a resilient member, provided in an annular recess in the surface of the through hole.

Providing a washer having a non-planar surface enables the washer to be used to engage with components having a corresponding non-planar external surface. The resilient member advantageously ensures that the washer is maintained in position on the fastener before installation of the fastener. As such, such a washer is particularly suitable for use in environments where installation is complex, difficult, and/or in restricted space. One particularly suitable use is for pipe repair couplings, where the repair coupling is typically installed in a small trench, around existing pipes.

The resilient member may be an o-ring. The o-ring may have a circular cross-sectional profile. Alternatively, the o-ring may have a square, rectangular, or cross, shaped cross-sectional profile. The o-ring may be formed of EPDM rubber, nitrile rubber, silicone rubber, butyl rubber, or another such material.

The non-planar surface of the washer is preferably a curved surface. The curved surface preferably has a substantially constant radius. Where the non-planar surface has a curved surface with a substantially constant radius, the curve is preferably an arc of a circle, the arc preferably subtends an angle less than 180 degrees, more preferably between about 90 degrees and about 150 degrees.

The washer preferably has a circular cross-sectional profile. Alternatively, the washer may have any cross-sectional profile in dependence on use. For example, the washer may have a square cross-sectional profile.

As used herein, the terms "preferably", "may", and "optionally", refer to features of the present invention which are not essential, but which may be combined with the claimed subject matter to form various embodiments of the invention.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

The invention will be further described, by way of example only, with reference to the accompanying drawings in which:

FIGS. 6(a) and 6(b) show a first configuration and a second configuration of the second member of the tensioning system respectively;

DETAILED DESCRIPTION

Figure 1:
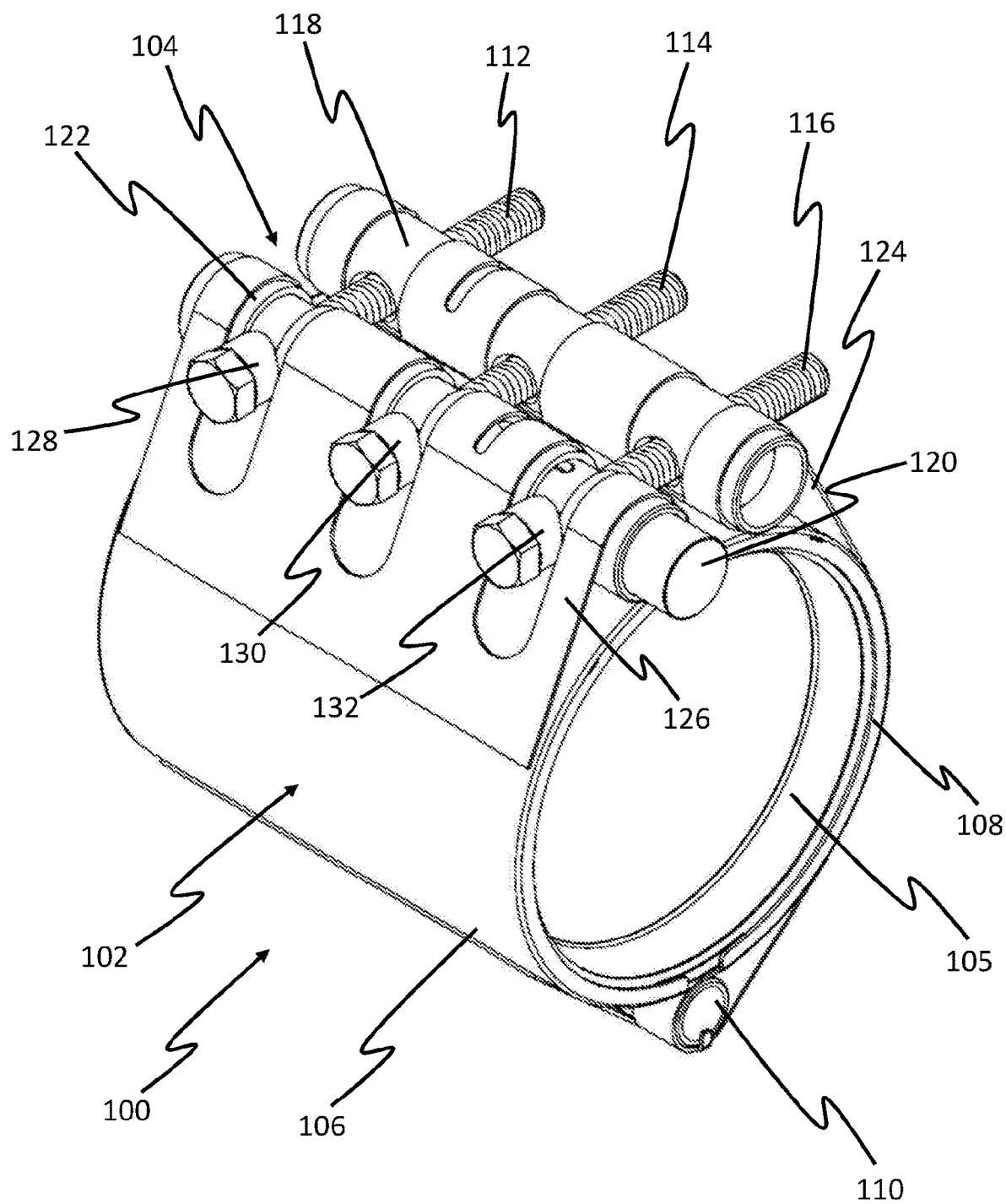
FIG. 1 shows a perspective view of a pipe coupling according to the present invention.

FIG. 1 shows a pipe coupling 100 suitable for use as a repair coupling. The pipe coupling comprises a tubular casing 102 for fitting around a pipe and a tensioning system 104 for tightening the casing 102 around the outer surface of the pipe (not shown). The tubular casing has a longitudinal gap between a first free end and a second free end, the tensioning system 104 configured to tighten the casing by drawing the free ends towards each other. A gasket 105 is provided within the casing 102 to form a seal about the pipe.

In this example, the tubular casing 102 is formed of two portions 106 and 108, hingedly coupled together by hinge 110. However, as will be appreciated, the casing 102 may be formed of a single strip of material.

The tensioning system 104 comprises three fasteners 112, 114, and 116 for tightening the casing around the pipe. The number of fasteners provided will be dependent on the overall dimensions of the pipe coupling and so may vary from two to six or more. The tensioning system also comprises a first member 118, coupled to a first free end of the casing, and a second member 120, coupled to a second free end of the casing. The second member 120 is slidable within a tubular portion 122. The free ends of a strip of material for forming the casing are folded back on themselves and welded to form loops 124, 126 for retaining the first member and second member. Slots are provided in the loops to allow clearance for the fasteners.

The fasteners in this example are bolts which are screwed into tapped holes in the first member 118. The head end of each fastener is provided with a washer 128, 130, 132, in the form of a saddle having a planar face to engage the head of the fastener and a non-planar, arcuate, face configured to engage with the tubular portion 122.

Figure 2:
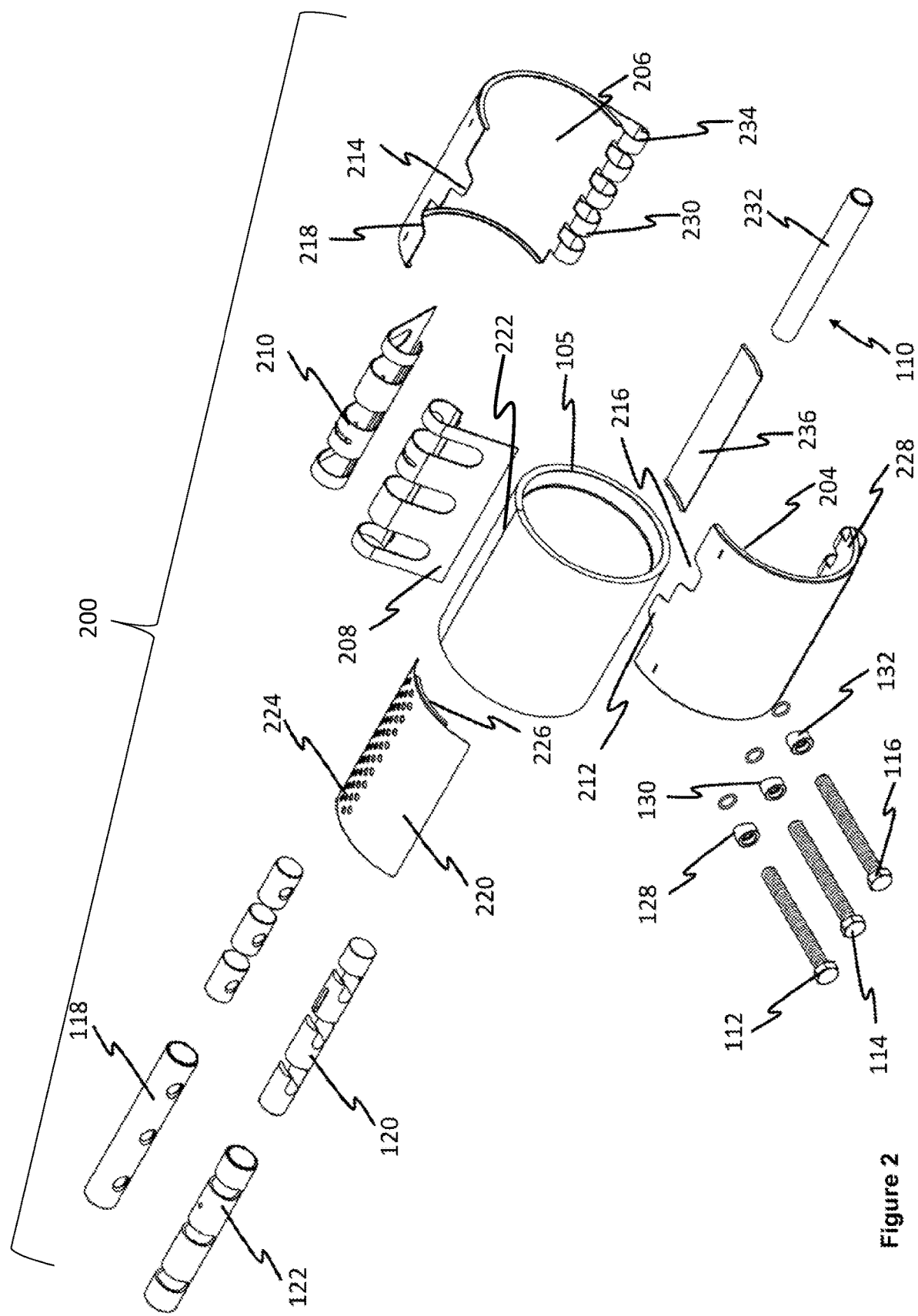
FIG. 2 shows an exploded view of a pipe coupling according to the present invention.

FIG. 2 shows an exploded view of a variation of the pipe coupling shown in FIG. 1. The pipe coupling 200 comprises the same tensioning system 104 as provided on the pipe coupling 100, but the casing is modified.

The casing 202 of pipe coupling 200 also comprises two portions 204 and 206. In this variant, the casing does not have integrated loop portions as for pipe coupling 100, but rather has separate loop portions 208 and 210. The loop portions 208 and 210 are welded to the respective casing portion 204 and 206 along each edge. This enables the free ends of the casing portions to be provided with projections 212 and 214 which are configured to engage with corresponding recesses 216 and 218. It will be understood that these projections and recesses are not essential, and are not provided in the casing 102.

Similarly to pipe coupling 100, described above, the pipe coupling 200 also comprises a gasket 105. The gasket is attached to a bridge plate 220, which is configured to span the longitudinal gap between the free ends of the casing. A similar bridge plate is provided in pipe coupling 100, but is not shown. The gasket has a longitudinal split 222, to enable the coupling to be opened and installed on a pipe in-situ. One end of the gasket 105, adjacent the longitudinal split, is attached to the bridge plate 220 using adhesive, welding, or the like. To enable a secure bond between the gasket 105 and the bridge plate 220, perforations 224 are provided in the bridge plate 220. Each axial end of the bridge plate 220 comprises a tab 226 configured to engage with corresponding elongate slots (not shown) adjacent the axial ends of the casing. The tabs are free to slide within the elongate slots.

Again, similarly to pipe coupling 100, described above, the pipe coupling 200 comprises a hinge 110, hingedly coupling the casing portions 204 and 206 together. As can be seen, the hinge is formed by folding back finger portions of the casing portions 204 and 206 to form loops 228, 230; once folded back, the ends of the finger portions are welded to the respective casing portions. The loops are formed in such a way that allows them to be interdigitated with each other, enabling a hinge pin 232 to be inserted into the loops, hingedly coupling the casing portions together. Tabs 234 are provided on the axial ends of the loops 228, 230, which are folded inwardly once the hinge pin 232 is inserted to retain the hinge pin 232 within the loops. A hinge bridge plate 236 is provided within the casing, adjacent the hinge, to support the gasket 105. The hinge bridge plate 236 is attached to one of the casing portions 204 or 206 by spot welding or the like.

Figure 3A:
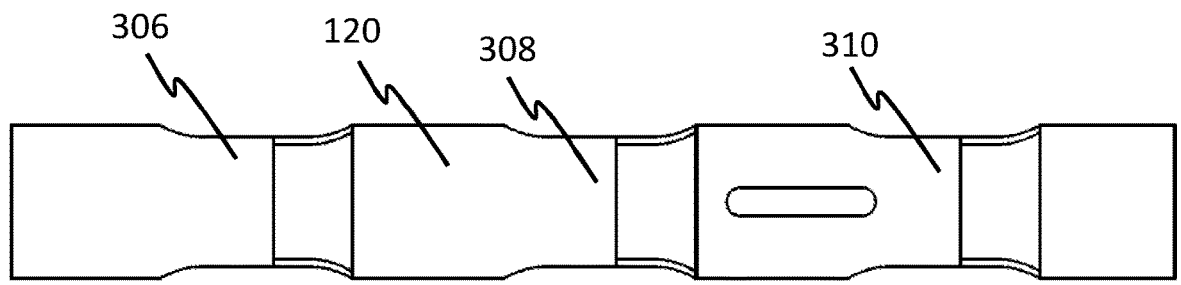
FIGS. 3(a), 3(b) and 3(c) show a second member of the tensioning system used in the pipe coupling shown in FIGS. 1 and 2.
Figure 3B:
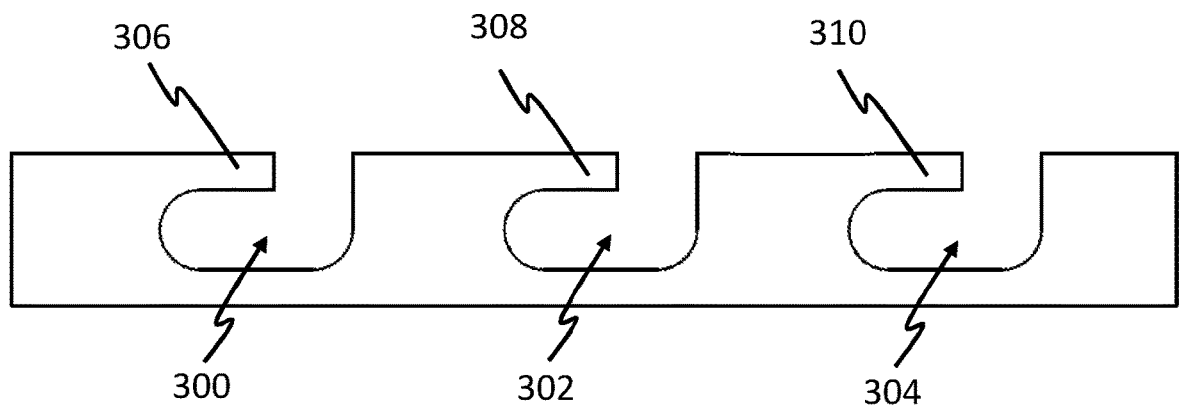
Figure 3C:
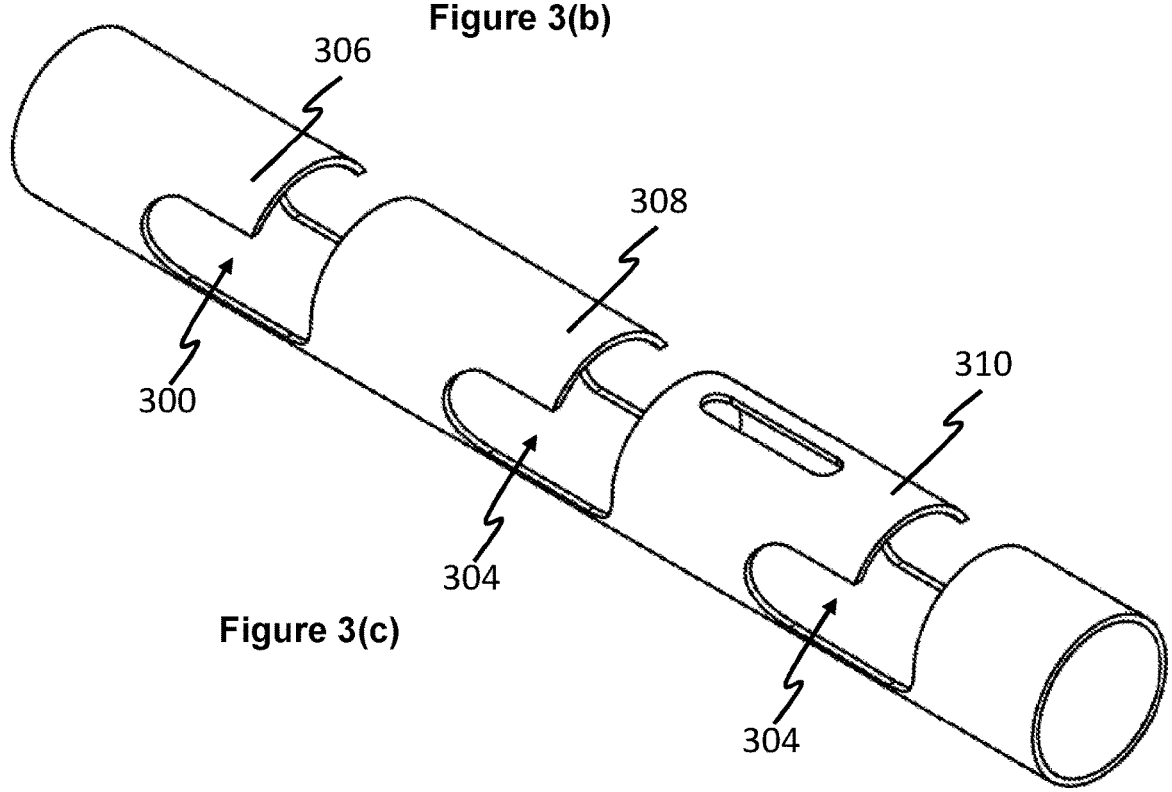

FIG. 3(a), a top view, FIG. 3(b), a side view, and FIG. 3(c) a perspective view, show the second member 120 in further detail. As can be seen the second member 120 comprises three elongate recesses 300, 302 and 304 extending along the longitudinal axis of the second member 120. Each elongate recess comprises a corresponding protrusion 306, 308 and 310 extending from one end of the recess. The protrusion partially covers the recess. The recess, and protrusion are sized to enable the fastener to pass through the uncovered portion of the recess, and then into the covered portion of the recess. The second member may be formed of a suitable plastic, such as a nylon, ABS or PEEK, or of a metal, such as stainless steel.

Figure 4A:
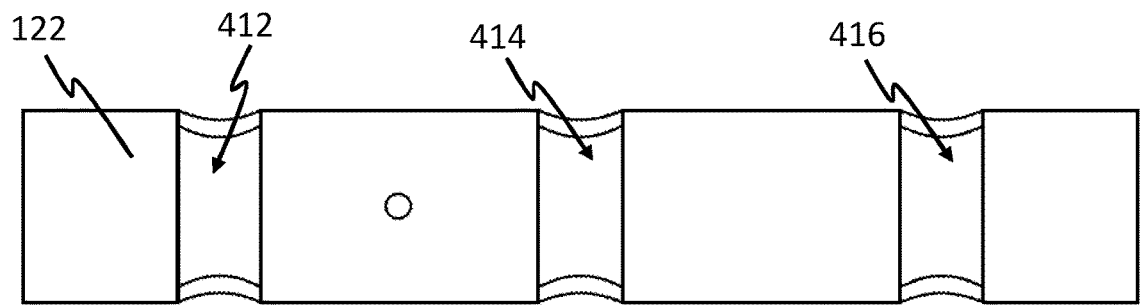
FIGS. 4(a), 4(b) and 4(c) show a tubular portion of the tensioning system used in the pipe coupling shown in FIGS. 1 and 2.
Figure 4B:
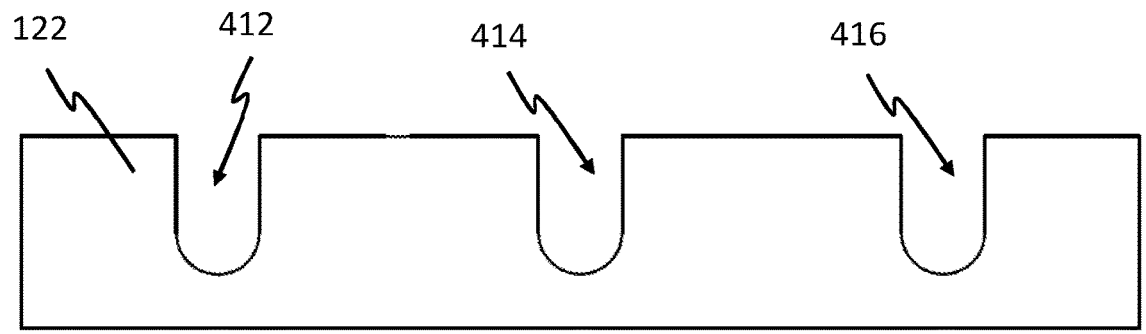
Figure 4C:
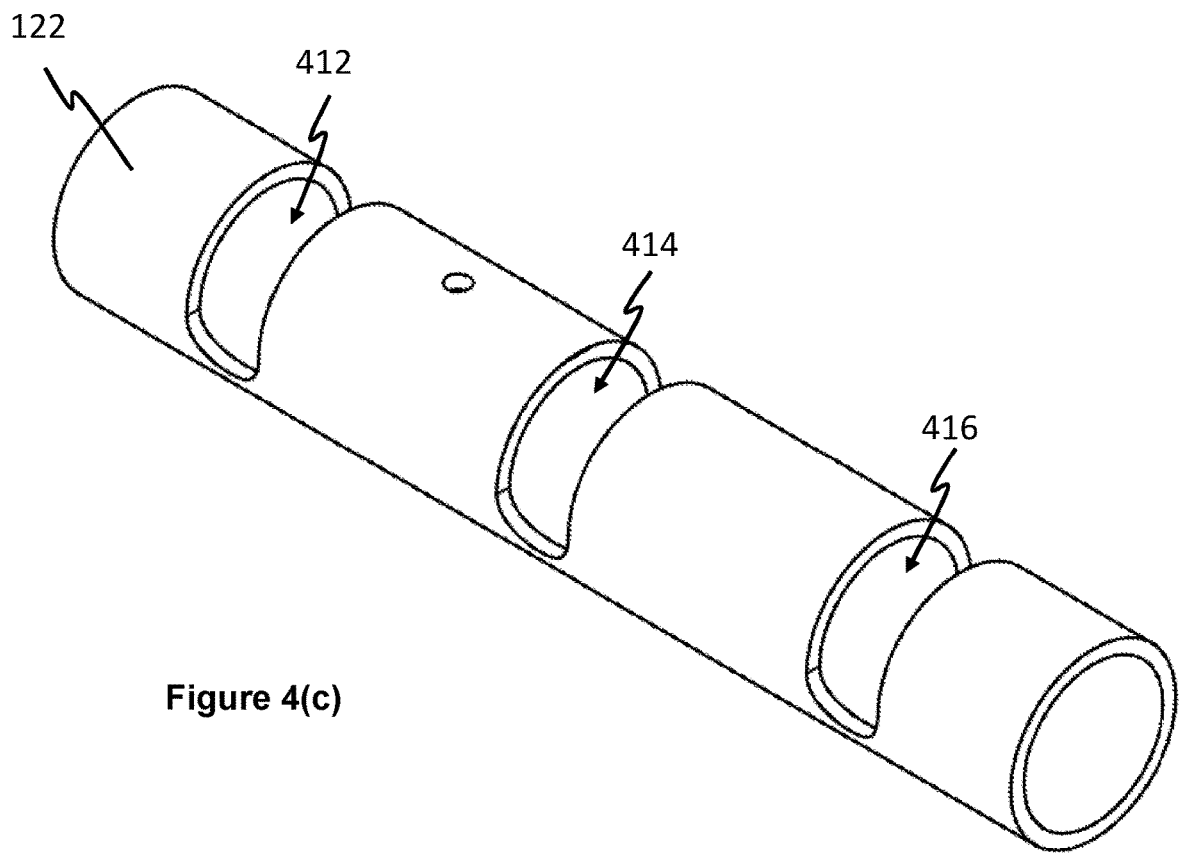

FIG. 4(a), a top view, FIG. 4(b) a side view, and FIG. 4(c) a perspective view, show the tubular portion 122 in further detail. As can be seen, the tubular portion 122 comprises three transverse slots 412, 414, and 416. The transverse slots are arranged to receive the fasteners, as shown in FIG. 1. The tubular portion 122 may be made of a metal, such as stainless steel.

Figure 5A:
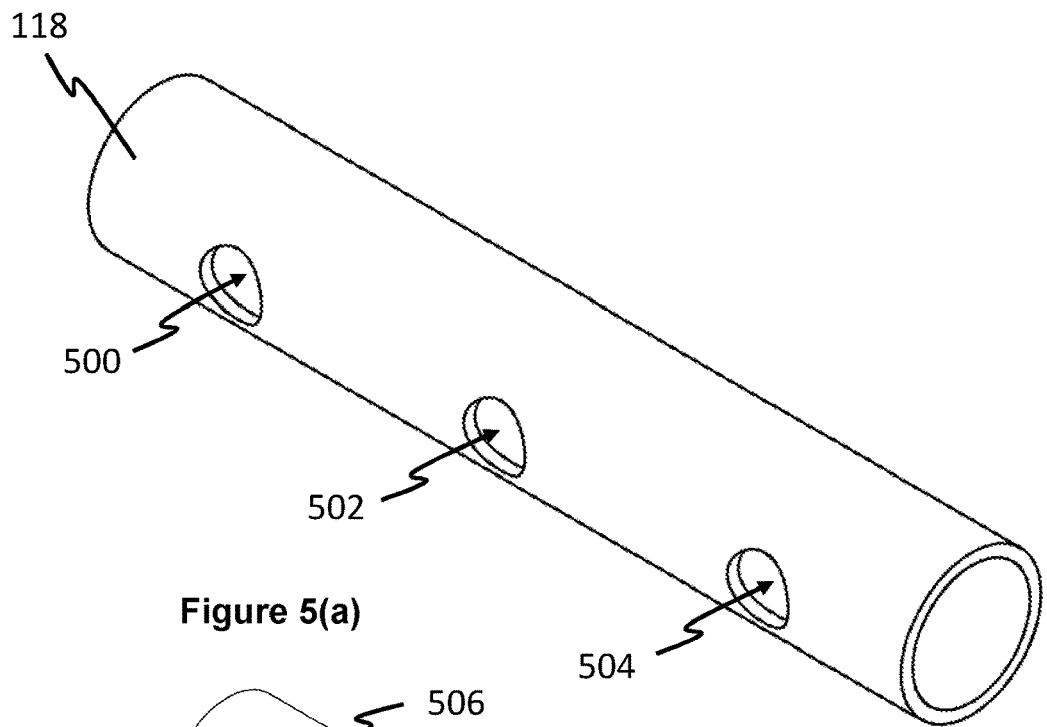
FIGS. 5(a), 5(b), 5(c), 5(d) and 5(e) show alternative components of a first member of the tensioning system used in the pipe coupling shown in FIGS. 1 and 2.

FIG. 5(a) shows a side view of a portion of the first member 118. The portion shown is formed of a hollow cylindrical tube, having through holes 500, 502 and 504 for receiving respective ones of the fasteners. The first member 118 is configured to be rotatable, along the longitudinal axis of the member, within the loop portion 124.

Figure 5B:
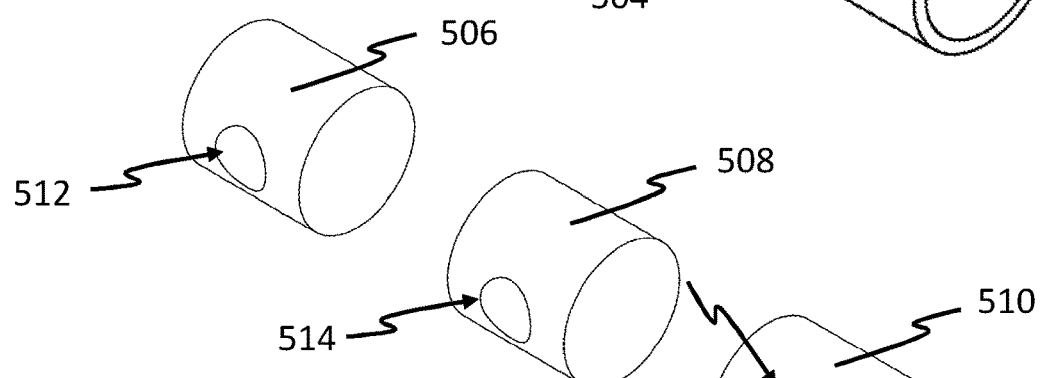
Figure 5C:
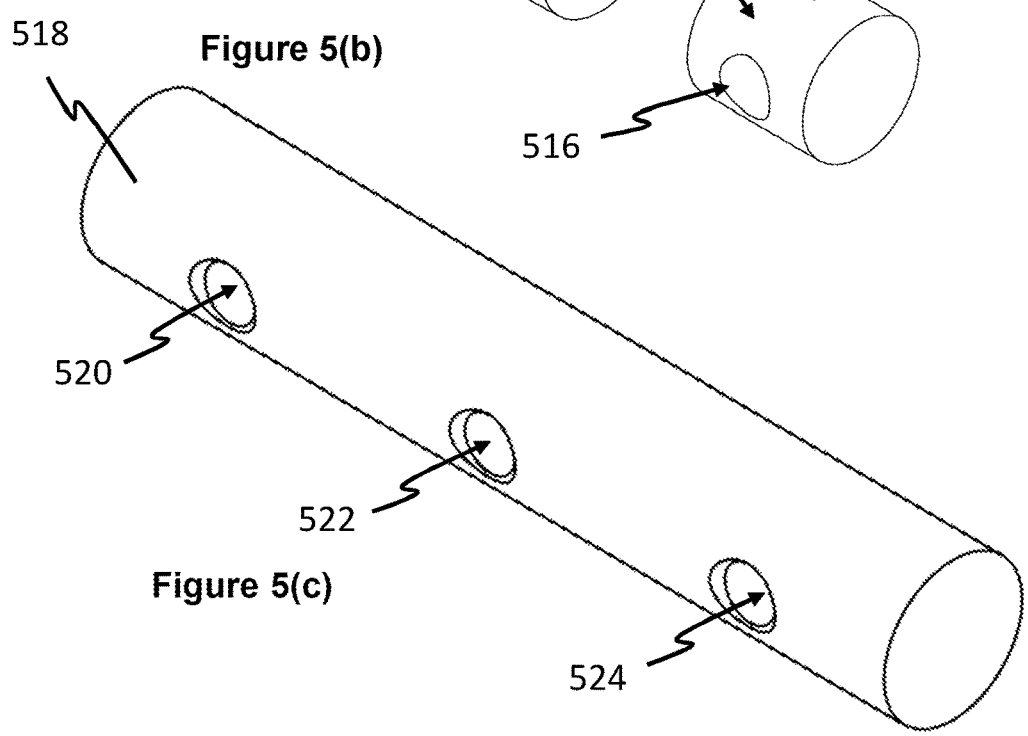
Figure 5D:
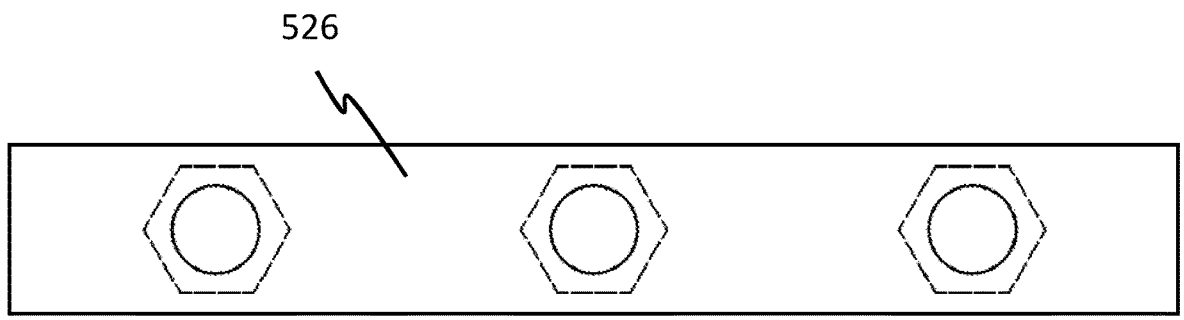
Figure 5E:
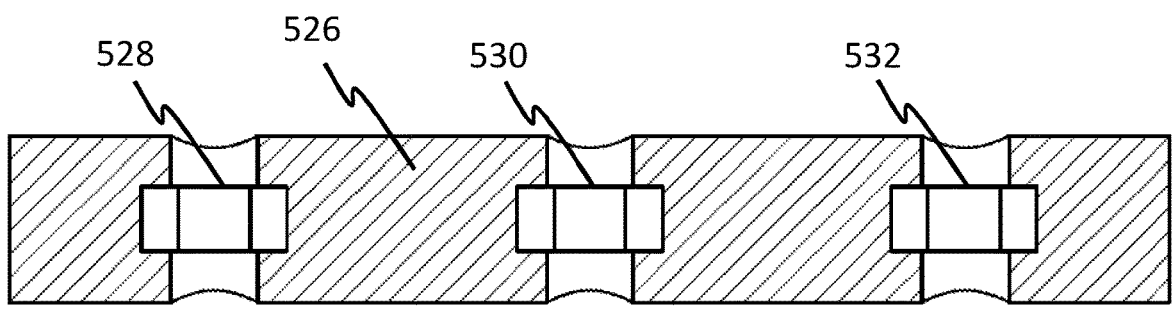

FIGS. 5(b), 5(c), 5(d), and 5(e) show alternatives for further portions of the first member, which are all inserts configured to be retained within the portion shown in FIG. 5(a). FIG. 5(b) shows three inserts 506, 508, and 510, each insert has a tapped hole 512, 514, and 516 for receiving a respective one of the fasteners. The inserts 506, 508, and 510 may be formed of metal such as stainless steel. FIG. 5(c) shows an alternative insert 518 having three tapped holes, 520, 522 and 524 each for receiving a respective one of the fasteners. The insert 518 may be formed of metal, such as stainless steel. FIGS. 5(d) and 5(e) show a yet further alternative insert 526 (FIG. 5(e) being a cross-sectional view of the insert 526 shown in FIG. 5(d)). Insert 526 comprises three captive nuts 528, 530 and 532 each for receiving a respective one of the fasteners. The main body of insert 526 is formed of a plastic, suitable for overmoulding the nuts to form the insert.

Operation of the pipe coupling 100, 200 and the tensioning system 104 will now be described with reference to FIG. 6(a) and FIG. 6(b). The second member 120 is slidable within the tubular portion 122 from a first position (shown in FIG. 6(a)) to a second position (shown in FIG. 6(b)). To prevent the second member 120 from sliding any further a groove 600 is provided therein. A pin, or screw or the like, is provided in a corresponding location on the loop portion 126, such that the groove 600 slides about the pin. In the first and second positions the pin abuts respective ends of the groove 600.

In the first position, shown in FIG. 6(a), the uncovered portions of the recesses 300, 302, and 304 are aligned with the transverse slots 412, 414 and 416 in the tubular portion 122. This alignment enables the fasteners 112, 114 and 116 to move radially inwardly into engagement with the second member. As will now be appreciated, the tensioning system enables easy and fast installation of the pipe coupling 100, 200 in confined spaces, such as in trenches where the pipes are already in-situ. The hinge 110 enables the casing portions to be moved apart, and the fasteners are rotated to open the gap between the free ends of the casing. The coupling is then placed around the pipes and brought together. The fasteners are then rotated into engagement with the second member (as shown in FIG. 6(a)). The second member is then moved to the second position, as shown in FIG. 6(b), to lock the fasteners within the second member and tubular portion. The pipe coupling is thus in a semi-installed configuration, requiring only that the fasteners are tightened to tighten the casing around the pipes.

To provide the installer with an indication of which configuration the second member is in, the first end 602 may be provided with indicia, such as a red portion, to indicate the tensioning system is unlocked, and/or the second end 604 may be provided with indicia, such as a green portion, to indicate the tensioning system is locked.

Figure 7:
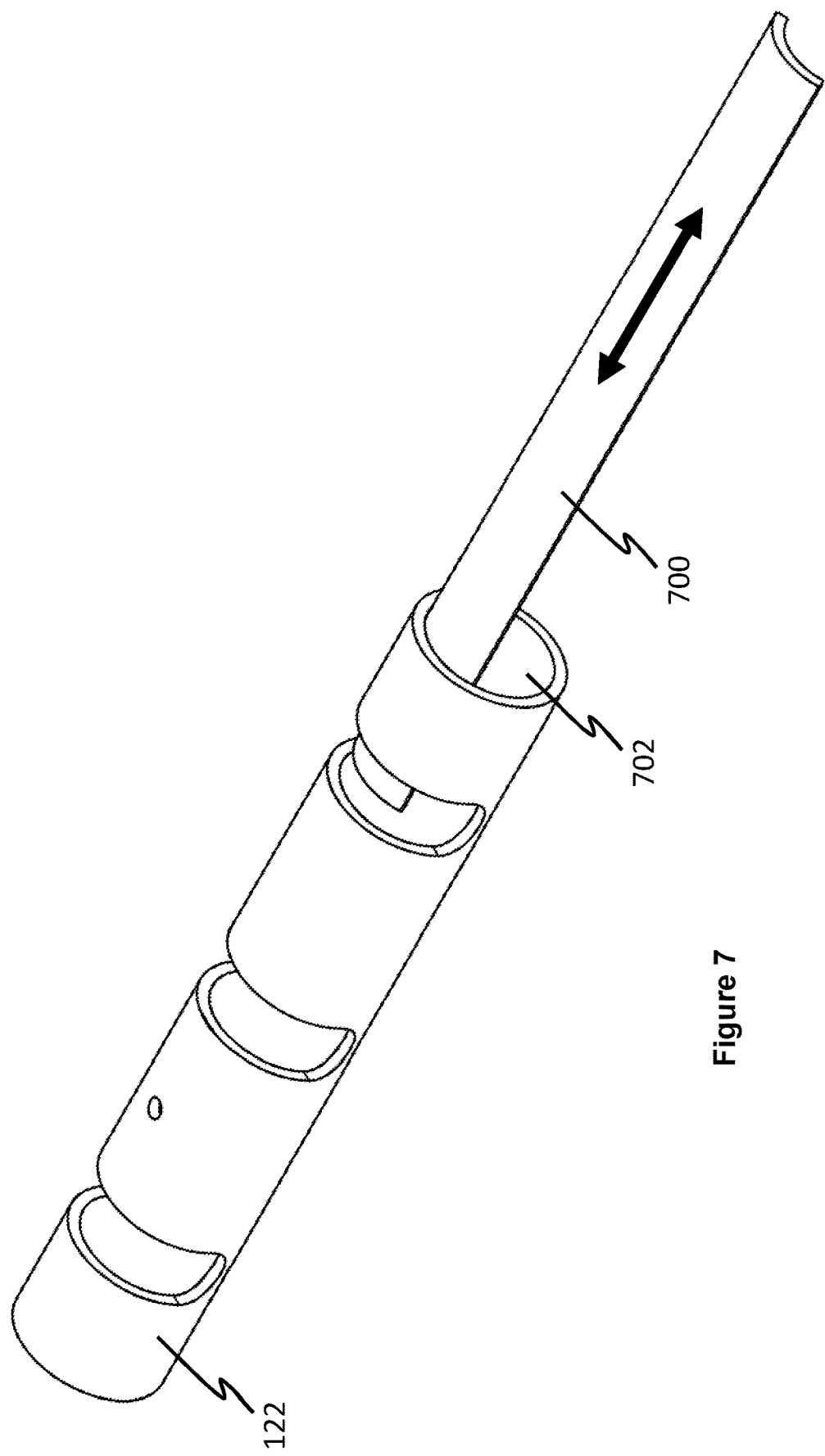
FIG. 7 shows an alternative second member of the tensioning system used in the pipe coupling shown in FIGS. 1 and 2.

FIG. 7 shows an alternative embodiment of a second member 700 for use in the tensioning system 104. As can be seen, the second member is a curved plate slidable within the tubular portion 122. A guide plug 702 is provide in the end of the tubular portion 122 having a bearing surface for receiving and guiding the curved plate 700. The curved plate 700 may be formed of a suitable plastic, such as a nylon, ABS, or PEEK material. A corresponding guide plug may be provided at the other end of the tubular portion 122 for receiving the second member 700. In all other respects, the tensioning system, when comprising the second member 700, operates as described above.

Figure 8:
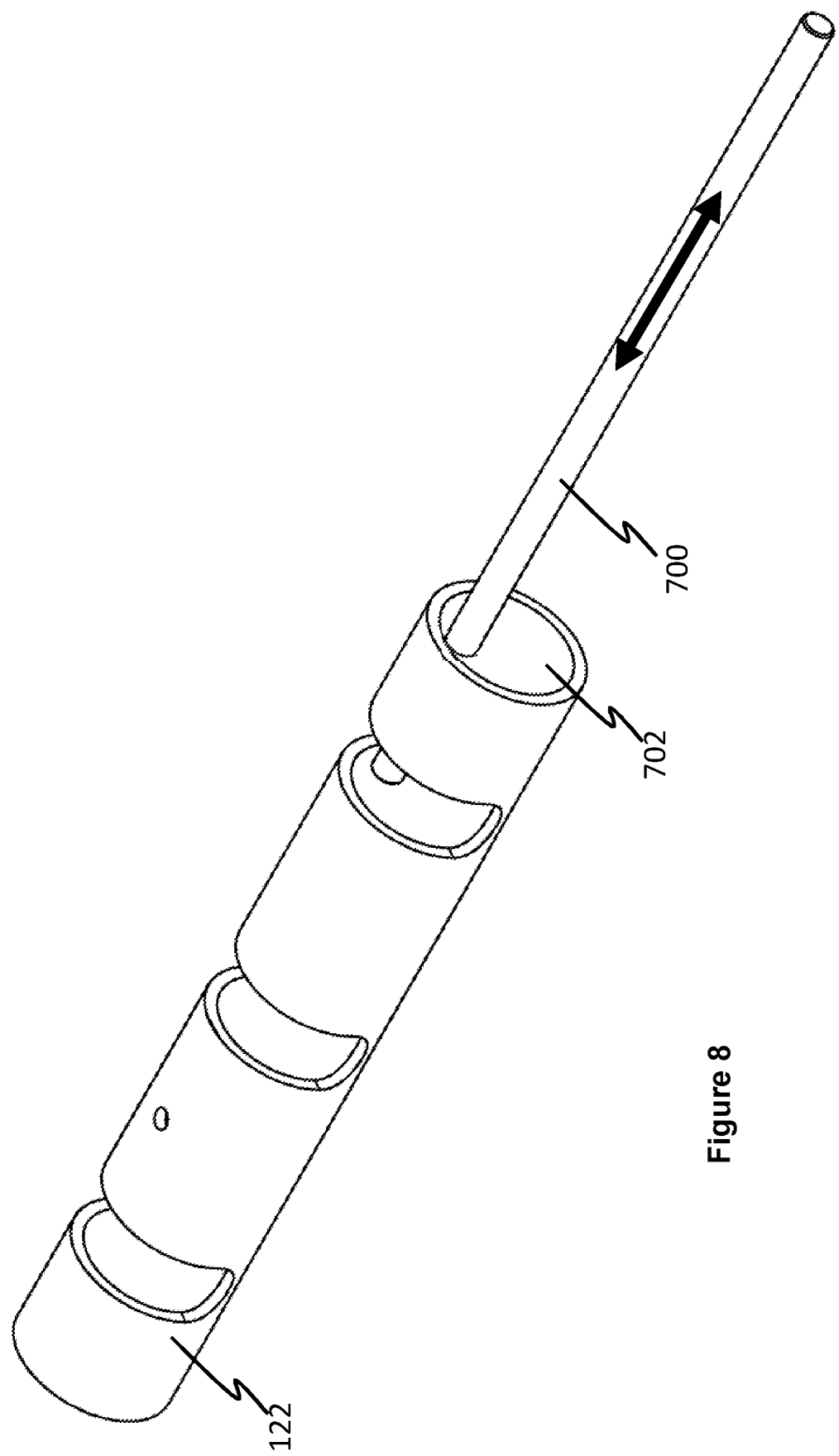
FIG. 8 shows a further alternative second member of the tensioning system used in the pipe coupling shown in FIGS. 1 and 2.

FIG. 8 shows a further alternative embodiment of a second member 800 for use in the tensioning system 104. As can be seen, the second member is an elongate rod slidable within the tubular portion 122. A guide plug 802 is provided in the end of the tubular portion 122 having a bearing surface for receiving and guiding the elongate rod 800. The rod 800 may be formed of a metal, such as stainless steel. The guide plug 802 may be formed of a suitable plastic, such as a nylon, ABS, or PEEK material. A corresponding guide plug may be provided at the other end of the tubular portion 122 for receiving the second member 800.

In all other respects, the tensioning system, when comprising the second member 800, operates as described above.

Figure 9A:
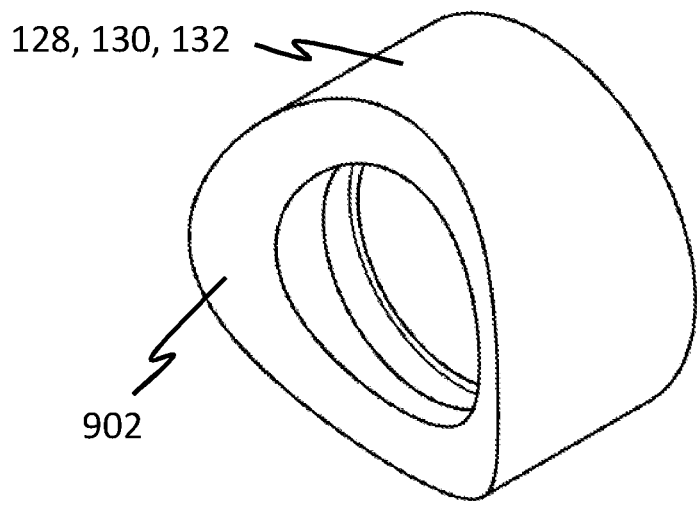
FIGS. 9(a) and 9(b) show a washer according to an aspect of the present disclosure.
Figure 9B:
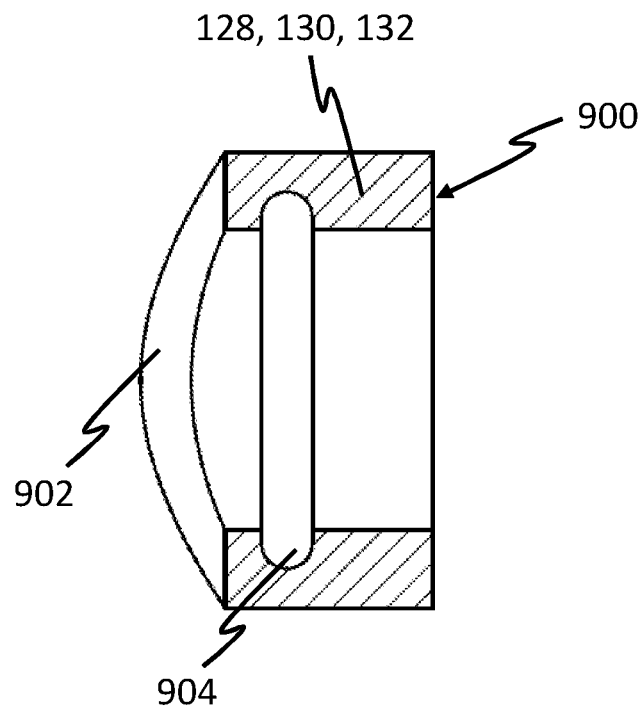

FIG. 9(*a*) and FIG. 9(*b*) show the washer 128, 130, 132 in further detail. As can be seen, a first planar face 900 and a second non-planar face 902 are provided. An annular recess 904 is provided on the internal surface of the washer. The annular recess is configured to receive an o-ring.

The planar face 900 is configured to engage with the head of the fastener, and the non-planar face is shaped and configured to engage with the tubular portion 122. Such as washer distributes the forces of the fastener to the tensioning system 104 via the tubular portion 122 more evenly.

The o-ring is sized such that an interference fit is provided between the washer and the fastener. In this way, the washer is maintained in any position along the fastener, and will not move under the influence of gravity alone. As such, before installation, the installer can move the washers to a position adjacent the head of the fastener, and carry out the installation as described above without having to reposition the washer before the fasteners can be engaged with the second member 120. This greatly simplifies the installation process.

The invention claimed is:

1. A pipe coupling comprising:
a tubular casing, having a longitudinal gap between a first free end and a second free end, for fitting around a pipe; and
a tensioning system for tightening the casing around an outer surface of the pipe, the system comprising:
at least one fastener having a first end and a second end, for tightening the casing around the pipe;
a first member, coupled to the first free end of the casing, configured to engage with the first end of the or each fastener; and
a second member, slidably coupled to the second free end of the casing, configured to engage with the second end of the or each fastener, the second member being longitudinally slidable from a first position, in which the or each fastener is free to move radially out of engagement with said second member, to a second position in which the or each fastener is in retained engagement with said second member, wherein the second member comprises: at least one elongate recess, the or each recess configured to receive a portion of a respective fastener adjacent the second end of the respective fastener; and at least one corresponding protrusion extending longitudinally from an edge of the recess to partially cover an open side of the recess, wherein:
in the first position, an uncovered portion of the recess is substantially longitudinally aligned with the corresponding fastener; and
in the second position, a covered portion of the recess is substantially longitudinally aligned with the corresponding fastener.

2. A pipe coupling according to claim 1, wherein the first member is rotatably coupled, about a longitudinal axis, to the first free end of the casing.

3. A pipe coupling according to claim 2, wherein the first member comprises a first tubular portion and at least one cylindrical portion, the cylindrical portion provided within the first tubular portion, wherein the or each cylindrical portion comprises at least one tapped through hole for receiving a respective fastener, the first tubular portion comprising at least one through hole, the or each through hole corresponding to a respective tapped hole.

4. A pipe coupling according to claim 3, wherein the first tubular portion has a length substantially corresponding to a longitudinal length of the casing, a total length of the or each cylindrical portion being less than the length of the first tubular portion.

5. A pipe coupling according to claim 3, the tensioning system comprising a plurality of fasteners, wherein the first member comprises a plurality of cylindrical portions, each cylindrical portion corresponding to a fastener.

6. A pipe coupling according to claim 1, wherein the tensioning system comprises at least one stop configured to limit the second member to longitudinal movement between the first position and second position.

7. A pipe coupling according to claim 6, wherein the stop comprises a pin attached to the casing, and a longitudinal elongate groove in the second member, the elongate groove configured to slide about the pin.

8. A pipe coupling according to claim 1, wherein the second member comprises indicia configured to indicate to a user when the second member is in the first position.

9. A pipe coupling according to claim 1, further comprising a tubular sealing gasket located inside the casing.

10. A pipe coupling according to claim 9, wherein the tubular casing further comprises two portions, and a hinge configured to hingedly coupled together the two portions, and wherein the tubular sealing gasket comprises a first end and a second end, and a longitudinal split between the first end and the second end, wherein the first end is coupled adjacent one of the first free end and the second free end of the casing.

11. A pipe coupling according to claim 10, wherein the first end of the tubular sealing gasket is attached to a bridge plate, the bridge plate being coupled adjacent one of the first free end and the second free end of the casing and configured to span the longitudinal gap.

12. A pipe coupling comprising:
a tubular casing, having a longitudinal gap between a first free end and a second free end, for fitting around a pipe; and
a tensioning system for tightening the casing around an outer surface of the pipe, the system comprising:
at least one fastener having a first end and a second end, for tightening the casing around the pipe;
a first member, coupled to the first free end of the casing, configured to engage with the first end of the or each fastener; and
a second member, slidably coupled to the second free end of the casing, configured to engage with the second end of the or each fastener, the second member being longitudinally slidable from a first position, in which the or each fastener is free to move radially out of engagement with said second member, to a second position in which the or each fastener is in retained engagement with said second member, wherein the tensioning system further comprises a tubular portion, coupled to the second free end of the casing, having at least one transverse slot, the or each slot configured to receive a respective fastener, the second member being configured to slide within said tubular portion from the first position to the second position.

13. A pipe coupling according to claim 12, wherein the or each fastener comprises a washer, having a planar face and a concave face, configured such that the fastener engages the planar face, and the concave face engages the tubular portion.

14. A pipe coupling comprising:
a tubular casing, having a longitudinal gap between a first free end and a second free end, for fitting around a pipe; and
a tensioning system for tightening the casing around an outer surface of the pipe, the system comprising:
at least one fastener having a first end and a second end, for tightening the casing around the pipe;
a first member, coupled to the first free end of the casing, configured to engage with the first end of the or each fastener; and
a second member, slidably coupled to the second free end of the casing, configured to engage with the second end of the or each fastener, the second member being longitudinally slidable from a first position, in which the or each fastener is free to move radially out of engagement with said second member, to a second position in which the or each fastener is in retained engagement with said second member, wherein the tubular casing further comprises two portions, and a hinge configured to hingedly coupled together the two portions.

15. A pipe coupling according to claim 14, wherein the first casing portion and second casing portion each comprise a plurality of loops, the loops being interdigitated, the hinge comprising a pin inserted through the interdigitated loops.

16. A pipe coupling according to claim 14, further comprising a hinge bridge plate located inside the casing for spanning the hinge.

17. A pipe coupling according to claim 16, wherein the hinge bridge plate is coupled, to one of the first casing portion or the second casing portion, adjacent the hinge.

* * * * *